Figure 3:
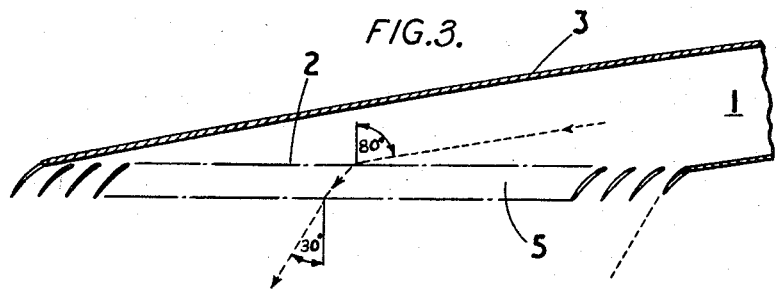

Jan. 19, 1954   I. M. DAVIDSON ET AL   2,666,453
GASEOUS FLUID FLOW SYSTEM
Filed June 28, 1948   2 Sheets-Sheet 1

Ivor Macaulay Davidson
Alfred Denis Snowdon Carter
Inventors

By Stevens Davis + Miller
their Attorneys

Jan. 19, 1954  I. M. DAVIDSON ET AL  2,666,453
GASEOUS FLUID FLOW SYSTEM
Filed June 28, 1948  2 Sheets-Sheet 2
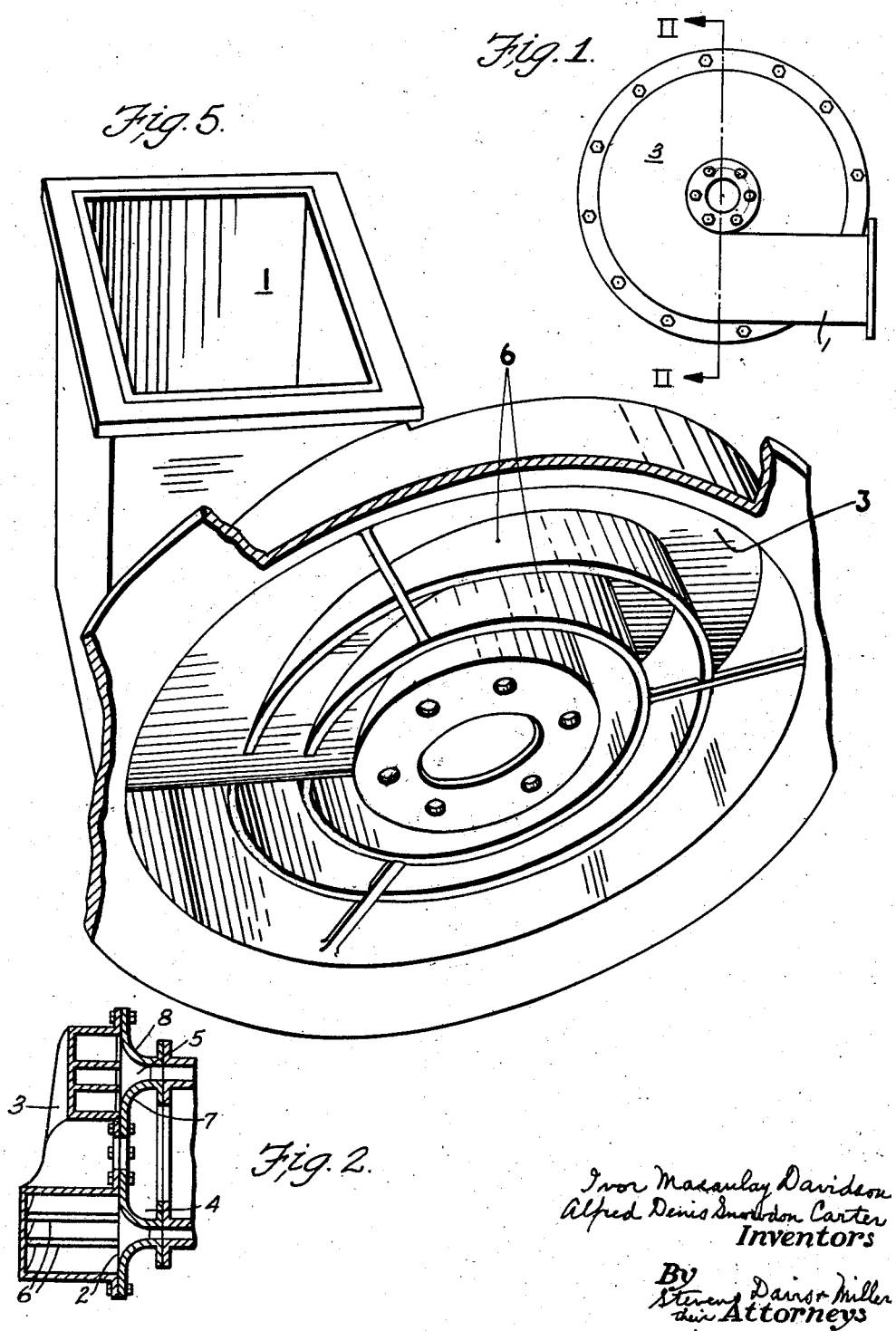

Patented Jan. 19, 1954

2,666,453

UNITED STATES PATENT OFFICE 2,666,453

GASEOUS FLUID FLOW SYSTEM

Ivor Macaulay Davidson and Alfred Denis Snowdon Carter, Farnborough, England, assignors to Power Jets (Research and Development) Limited, London, England, a British company Application June 28, 1948, Serial No. 35,730

3 Claims. (Cl. 138—37)

This invention relates to gaseous fluid flow systems in which the fluid passing through the system has a substantial component of whirl velocity such as occurs, for example, in the case of a combination of linear flow with a free or other vortex. The invention aims to deal with a case of this kind in which it is a requirement that the whirl component of velocity should be reduced or eliminated and in general has for its object to provide means which will enable the attainment of a high ratio between the magnitude of the change of whirl velocity and the axial distance (i. e. distance in the general direction of flow) in which such change is effected, so that a change of large magnitude can take place in a short distance. The invention further aims to effect this with an acceptable loss and whilst maintaining a satisfactory outlet velocity distribution.

It is customary, where it is desired to change a component of velocity of a fluid, to use a cascade comprising one or more rows of similar direction changing blades arranged in the flow, and it will be appreciated that, in the circumstances referred to above, the objects stated are best fulfilled by using the fewest possible number of rows of blades giving the greatest possible change of direction. It is well known, however, from established performance characteristics of cascades of different blade sections under the usual test conditions of fluid flow in which change of direction of the fluid is confined substantially to planes transverse to the blades, commonly referred to as two-dimensional flow conditions, that blades of very high camber angle (that is, total change of direction) are not capable of efficient operation under such conditions due to the tendency to complete separation of the flow from the blading. This is, moreover, particularly so when the inlet angle of the blading is very high. An illustration of this aspect of the operation of blade cascades is afforded by a consideration of two blade cascades, each effecting a change of direction of 50° in the fluid passing therethrough, but one of which has an inlet angle of 80° and the other of 50°, with outlet angle of 30° and 0° respectively (such angles being measured, in the conventional manner, from a normal to the inlet and outlet planes of the blade cascade). The effective inlet or outlet area of a blade cascade is the product of the area in the plane of inlet or outlet and the cosine of the inlet or outlet angle respectively, so that the two types of blading above described, considered with regard to their performance under two dimensional flow conditions, would both afford increased area as between inlet and outlet; since:

Cos 80° : Cos 30° as 0.1736 : 0.866 and

Cos 50° : Cos 0° as 0.6428 : 1.0 but the degree of increase would be much greater in the first case, where the inlet angle is large, than in the second case, since:

$$\frac{\text{Cos } 30°}{\text{Cos } 80°} = \frac{0.866}{0.1736}$$

is obviously much greater than $$\frac{\text{Cos } 0°}{\text{Cos } 50°} = \frac{1.0}{0.6428}$$

Thus, it follows that the larger the inlet angle, the greater will be the relative increase in area, considered with regard to its performance under two-dimensional flow conditions, through the blading for a given change of direction of flow, and hence the greater will be the diffusion effected by the blading and, consequently, the tendency for a breakdown in the flow.

Accordingly, the invention proposes to include, in a gaseous fluid flow system, an outer circumferential wall and radially inward thereof and concentric therewith an inner circumferential wall defining with said outer wall an annular flow path for the gaseous fluid, and, for reducing the circumferential velocity component of fluid flowing axially through said annular flow path, a circumferential row of similarly shaped blades lying in a plane normal to the axis of the annular flow path, each blade of the row extending longitudinally between said inner and outer walls and being, in section in a transverse plane, of streamlined profile with an inlet angle large in relation to the outlet angle whereby the width of the passage between adjacent blades, measured in the section plane, increases substantially in the direction of flow, wherein said inner and outer walls converge in the radial direction to effect a progressive decrease in the radial height of said passage in the direction of flow, such decrease in height being greater than the corresponding increase in width of said passage whereby the flow area thereof is reduced between inlet and outlet and fluid is accelerated in passing therethrough. The inlet and outlet angles of the section profile of a blade in a circumferential blade row will correspond, again in the conventional manner, to the angles of inclination of the respective blade edges to the trace, in the section plane, of a plane passing through the axis of the circumferential blade row and therefore normal to the plane in which the blade row lies.

In the circumstances where it is intended, in a fluid vortex flowing in an annular duct, to effect a reduction in the whirl component of velocity by the use of direction changing blading, and where the inlet angle to the blading is necessarily large in comparison with the outlet angle therefrom due to the comparative magnitudes of the initial whirl and axial velocities, the use of the invention avoids the necessity of effecting the direction change gradually as, for example, by means of a plurality of successive blade cascades, and consequently offers the possibility of a much more compact structure. For example, to reduce the whirl component in a fluid vortex in relation to its translation to its translational component so as to reduce the angle of the helix described by the fluid from 80° to 30° it is proposed to employ a single stage circumferential blade row effecting the entire change of direction, radial height of the passage between the blades being made sharply convergent. In one practical design for example the actual convergence of the passage between blades effecting such a change is such that the cross sectional area normal to the flow at outlet is of the order of 80% of that at inlet.

The features described in the foregoing are deemed to have a particularly advantageous application in systems of ducting of fluid dynamic plant such as, for example, gas turbines or air compressors. It is commonly necessary, in order to achieve compactness in the arrangement of such plant, for ducted fluid moving in a given direction to undergo an abrupt change in direction before entering a particular component of the plant and for this purpose it is convenient to admit the fluid through a duct having the form of a volute. Thus, if it is desired to change the direction of flow abruptly through, for example, a right angle, the flow moving in its original direction is led into a volute wherein its linear velocity component is converted to a whirl component about an axis parallel to the new direction of motion and, simultaneously, a linear component of velocity of motion in the new direction is imparted by the volute. In such circumstances the invention further contemplates the combination of the features described in the foregoing in the volute. Accordingly there is provided an intake volute whose developed form is that of a wedge of which one of the faces containing the included angle of the wedge is completely open and constitutes the outlet from the volute, diminution of the cross sectional area of the volute from inlet to outlet being effected entirely by convergence of a wall representing the opposite face of the wedge upon the plane of the outlet face. The flow thus leaves the volute in an axial direction and with a whirl component of velocity corresponding to the angle of the wedge, and constitutes a source of flow of the kind proposed to be dealt by the main features of the invention already described. Accordingly, in the outlet from the volute there is provided direction-changing blading arranged in accordance with the main feature of the invention in a passage which is sharply convergent in the direction of flow and in a plane normal to that of the change of direction provided by the blading.

Figure 4:
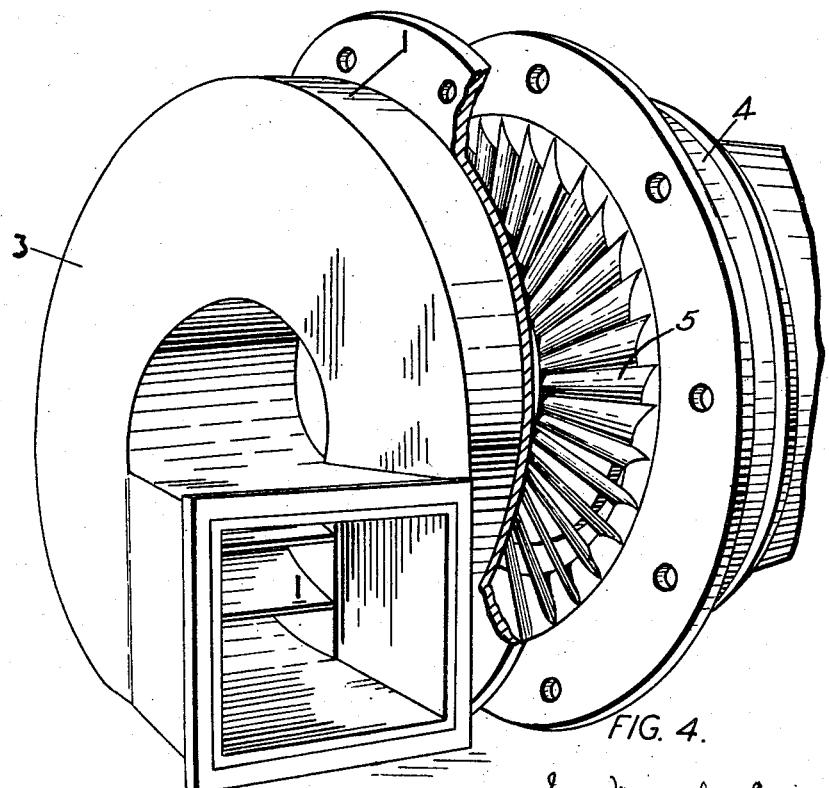

An example of a volute assembly constructed in accordance with the invention is illustrated in the accompanying drawings, which will also serve to illustrate the broader aspect of the invention, and in which Figure 1 is an end elevation of the volute assembly; Figure 2 is an axial cross-section of the volute assembly of Figure 1 looking in the direction of the arrows II—II; Figure 3 is a diagrammatic representation of a corresponding developed cross-section taken on the mean diameter of the volute; Figure 4 is a corresponding exploded perspective view to an enlarged scale of the volute assembly; and Figure 5 is a perspective view again to an enlarged scale of the volute part of the assembly looking at its outlet face, the remainder of the assembly being omitted for clarity.

As will be seen from the drawings, a 360° volute is formed by a duct 1 of rectangular cross section of which three sides are defined by the volute walls while the fourth side, in a plane normal to the axis of the volute, is completely open to constitute an annular outlet 2 of uniform width extending through the whole 360° of the volute, the necessary diminution in cross-sectional area of the volute being obtained by convergence of the opposite wall 3 towards the outlet side. In the practical case illustrated the developed form of the volute, as illustrated in Figure 3, is that of a wedge of 10° included angle, and thus produces a discharge having a motion in a helical path at an angle of approximately 80° to the axis of the volute. In order to reduce this whirl an annular bladed outlet duct ring 4 is connected to the outlet from the volute, which ring comprises inner and outer circumference duct walls 7 and 8 containing a single stage blade cascade 5 capable of reducing the angle of the whirl component of velocity of fluid flowing therethrough from 80° to 30°. Considered from the point of view of two-dimensional flow such a blade cascade would either have to have such an incidence as to be completely stalled, or such a camber as to result in flow separation, and in order to stabilise the flow the walls 7 and 8 of the annulus in which the blades are mounted are made sharply convergent (see particularly Figure 2) the actual convergence in the example illustrated being such that the normal cross-sectional area at outlet is of the order of 80% of that at inlet. While the cross section of the blades 5 is such as to afford passages of increased width from inlet to outlet and to cause diffusion if the blades were mounted in a parallel sided annulus, the convergence in the radial height of the passages is so arranged that the combined result will be a slight decrease in the cross-sectional area of the stream normal to the direction of flow producing a rapid acceleration and so affording an increase in stability thereof. It has been found that with a construction such as that illustrated the blading can operate with an incidence or a camber well beyond that normally practicable when considered in regard to its performance under two-dimensional flow conditions and produce the required change of the whirl component of velocity with an acceptable pressure loss and while maintaining a good velocity distribution. In this latter connection a further improvement in the velocity distribution is achieved by the provision in the volute of concentric splitters 6 as illustrated in Figures 2 and 5. These splitters afford radially subdividing walls across the volute which overcome to some extent the natural tendency of the fluid flowing therethrough to adopt a non-uniform velocity distribution. Thus in the absence of the splitters the fluid would tend on one hand to concentrate due to centrifugal effects toward the radially outer wall of the volute and on the other hand to conform to a free vortex whereby its whirl component of velocity would be progressively reduced toward the radially outer wall. These effects may well lead to a variation of the flow conditions across the radial dimension of the volute of such magnitude as to necessitate blades of varying radial cross-section at the outlet of the volute. However, by providing the splitters 6 the variation is confined to the radial distance between one splitter and an adjacent splitter or volute wall, and may thus be accommodated by blades of constant radial cross-section.

It will be apparent that the invention has the further advantage of permitting a very compact construction considering the very large deviation of flow obtainable.

We claim:

1. A gaseous fluid flow system including an outer circumferential wall and radially inward thereof and concentric therewith an inner circumferential wall defining with said outer wall an annular flow path for the gaseous fluid, and, for reducing the circumferential velocity component of fluid flowing axially through said annular flow path, a circumferential row of similarly shaped blades lying in a plane normal to the axis of the annular flow path, each blade of the row extending longitudinally between said inner and outer walls and being, in section in a transverse plane, of streamlined profile with an inlet angle large in relation to the outlet angle whereby the width of the passage between adjacent blades, measured in the section plane, increases substantially in the direction of flow, wherein said inner and outer walls converge in the radial direction to effect a progressive decrease in the radial height of said passage in the direction of flow, such decrease in height being proportionately greater than the corresponding increase in width of said passage whereby the flow area thereof is reduced between inlet and outlet and fluid is accelerated in passing therethrough.

2. A gaseous fluid flow system including volute means for delivering gaseous fluid with both an axial and a substantial circumferential velocity component, said volute means having an outlet comprising an outer circumferential wall and radially inward thereof and concentric therewith an inner circumferential wall defining with said outer wall an annular flow path for the gaseous fluid, and, for reducing the circumferential velocity component of fluid flowing axially through said annular flow path, a circumferential row of similarly shaped blades lying in a plane normal to the axis of the annular flow path, each blade of the row extending longitudinally between said inner and outer walls and being, in section in a transverse plane, of streamlined profile with an inlet angle large in relation to the outlet angle whereby the width of the passage between adjacent blades, measured in the section plane, increases substantially in the direction of flow, wherein said inner and outer walls converge in the radial direction to effect a progressive decrease in the radial height of said passage in the direction of flow, such decrease in height being proportionately greater than the corresponding increase in width of said passage whereby the flow area thereof is reduced between inlet and outlet and fluid is accelerated in passing therethrough.

3. A gaseous fluid flow system as claimed in claim 2, wherein radially spaced baffles are provided within said volute means for dividing the fluid flowing therethrough.

IVOR MACAULAY DAVIDSON.
ALFRED DENIS SNOWDON CARTER.

References Cited in the file of this patent

UNITED STATES PATENTS

| Number | Name | Date |
|---|---|---|
| 1,246,159 | Ricardo et al. | Nov. 13, 1917 |
| 1,561,835 | Dahlstrand | Nov. 17, 1925 |
| 1,671,719 | Hayes | May 29, 1928 |
| 1,839,616 | Thoma | Jan. 5, 1932 |
| 2,174,598 | Quick et al. | Oct. 3, 1939 |
| 2,313,256 | Morgan | Mar. 9, 1943 |
| 2,341,296 | Slade | Feb. 8, 1944 |
| 2,362,355 | Collicutt | Nov. 7, 1944 |
| 2,446,785 | Quick | Aug. 10, 1948 |

FOREIGN PATENTS

| Number | Country | Date |
|---|---|---|
| 8,461 | Great Britain | Apr. 16, 1908 |
| 260,295 | Germany | May 24, 1913 |
| 337,118 | Germany | Aug. 4, 1918 |
| 456,980 | Great Britain | Nov. 16, 1936 |
| 461,757 | Great Britain | Feb. 24, 1937 |
| 479,322 | Great Britain | Feb. 2, 1938 |